(12) United States Patent
Jingu

(10) Patent No.: US 6,260,518 B1
(45) Date of Patent: Jul. 17, 2001

(54) DIRECT INJECTION SPARK-IGNITED INTERNAL COMBUSTION ENGINE

(75) Inventor: Nobuhisa Jingu, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/457,356

(22) Filed: Dec. 9, 1999

(30) Foreign Application Priority Data

Dec. 18, 1998 (JP) .................................................. 10-361294

(51) Int. Cl.$^7$ ........................................................ F02F 1/36
(52) U.S. Cl. ...................................... 123/41.82 R; 123/305
(58) Field of Search ........................ 123/41.82 R, 41.72, 123/193.3, 193.5, 305, 302

(56) References Cited

U.S. PATENT DOCUMENTS 5,799,627 * 9/1998 Dohn et al. .................. 123/41.82 R
5,983,843 * 11/1999 Suzuki et al. ................. 123/41.82 R

FOREIGN PATENT DOCUMENTS 9-119344    5/1997  (JP) .
11-182330   7/1999  (JP) .

* cited by examiner

Primary Examiner—Noah P. Kamen
Assistant Examiner—Hai Huynh
(74) Attorney, Agent, or Firm—Foley & Lardner

(57) ABSTRACT

A direct injection spark-ignited internal combustion engine according to the present invention has a fuel injection valve that injects fuel directly into a fuel combustion chamber and is provided to a cylinder head, a fuel injection valve gasket that is inserted between the cylinder head and the fuel injection valve, and a water hole that is formed in a cylinder head gasket near the fuel injection valve gasket. The fuel injection valve is cooled through a seal portion of the fuel injection valve gasket, by cooling water in contact with the bottom surface of the cylinder head through the water hole.

10 Claims, 4 Drawing Sheets

DIRECT INJECTION SPARK-IGNITED INTERNAL COMBUSTION ENGINE

BACKGROUND OF THE INVENTION

The present invention relates to a direct injection spark-ignited internal combustion engine, and more particularly to a direct injection spark-ignited internal combustion engine with improved cooling performance of a fuel injection valve.

In a direct injection spark-ignited internal combustion engine, if the heat radiation performance of the fuel injection valve is poor, the fuel injection valve will rise to a high temperature. If this occurs, volatile components of fuel that has become attached to the high-temperature fuel injection valve evaporate before the fuel is ignited and their remaining gum components are carbonized by the heat so that they remain as deposits. In such a case, it becomes difficult to achieve a highly precise fuel injection and this interferes with stable fuel combustion.

In the Japanese laid-open patent application publication H9-119344, there is a disclosure of a cooling structure for a fuel injection valve in which a depression formed at the bottom surface of a cylinder block and a cooling water path are communicated with each other through a communication path.

SUMMARY OF THE INVENTION

According to an investigation by the inventor, a cooling structure for a fuel injection valve can be described as shown in FIG. 4.

In the cylinder head 101 shown in FIG. 4, a fuel combustion chamber 102 is formed by a depression in the center of the bottom surface of the head 101, and a spark plug mounting hole 103 having a centerline IGCL is formed at a position in proximity to the center of the fuel combustion chamber 102, into which is mounted a spark plug (not shown in the drawing).

The cylinder head 101 has an intake port 104 formed on the centerline IPCL and an exhaust port 105 formed on the centerline EPCL, these communicating with the fuel combustion chamber 102, so as to surround the spark plug mounting hole 103, an intake valve and an exhaust valve (neither shown in the drawing) being mounted to each of these apertures leading to the fuel combustion chamber. Two each of intake ports 104 and exhaust ports 105 are provided.

Between and below the two intake ports 104 of the cylinder head 101 (on the outer periphery of the fuel combustion chamber 102), is formed a fuel injection valve mounting hole 108 on the centerline FICL, into which is mounted a fuel injection valve (not shown in the drawing). The fuel injection valve injects fuel directly into the fuel combustion chamber 102.

As a cooling structure for cooling the fuel injection valve, a part of the cooling water path 109 disposed at the bottom of the spark plug mounting hole 103 is provided with a cooling water path expanded part 110 formed on the fuel injection valve mounting hole 108 side, and a first and second lower cooling water path 111 and 112 disposed on the bottom of the fuel injection valve.

The above-noted cooling water expanded part 110 and the first lower cooling water path 111 are formed by means of a sand core, and the second lower cooling water path 112 provided as a depression in the bottom surface of the cylinder head 101 is formed by a casting hollow.

In the above-noted cooling structure for a fuel injection valve, however, because of the casting hollow formed by the protrusion in the sand mold, it is necessary to provide a depression in the bottom surface of the cylinder head 101, and it is necessary to maintain a wall thickness of at least approximately 4 mm to achieve accurate casting of the cylinder head. This causes the fuel injection valve and cooling water to be at a distance from each other, so that it is not possible to achieve effective cooling of the fuel injection valve or, more specifically, cooling of the gas seal portion between the fuel injection valve and the cylinder head, thereby leaving room for improvement in the related art.

Accordingly, in consideration of the above-noted investigation, it is an object of the present invention to provide a direct injection spark-ignited internal combustion engine in which the gas seal portion between the fuel injection valve and the cylinder head is effectively cooled, thereby preventing the deposits from forming on the nozzle of the fuel injection valve, and enabling highly precise fuel injection.

In order to achieve the above-noted object, a direct injection spark-ignited internal combustion engine according to the present invention has a fuel injection valve that injects fuel directly into a fuel combustion chamber and is provided to a cylinder head, a fuel injection valve gasket that is inserted between the cylinder head and the fuel injection valve, and a water hole that is formed in a cylinder head gasket near the fuel injection valve gasket. Here, the fuel injection valve is cooled through a seal portion of the fuel injection valve gasket, by cooling water in contact with the bottom surface of the cylinder head through the water hole.

Stated in other terms, a direct injection spark-ignited internal combustion engine according to the present invention has a cylinder head, a cylinder block, a gas seal portion disposed between the cylinder head and the cylinder block, fuel injection means, provided to the cylinder head, for injecting fuel directly into a fuel combustion chamber, and cooling means for cooling the fuel injection means. Here, the cooling means has a water hole formed in the gas seal portion near the fuel injection means, and cooling water in contact with the cylinder head through the water hole acts to cool the fuel injection means.

DETAILED DESCRIPTION OF THE PREFERRED EMBODIMENTS

Preferred embodiments of the invention are described in detail below, with reference to relevant accompanying drawings.

First, a direct injection spark-ignited internal combustion engine according to the first embodiment of the present invention will be described, with reference to FIGS. 1A to 2.

Figure 1A:
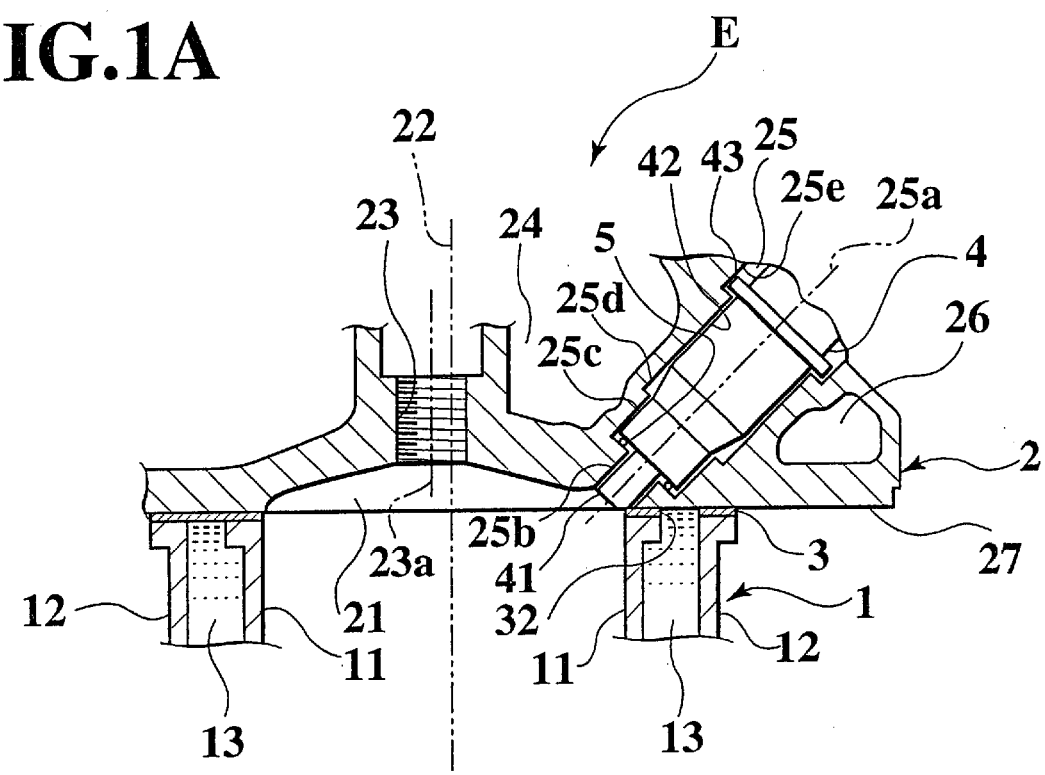
FIG. 1A is a vertical cross-section view of the main part of a direct injection spark-ignited internal combustion engine according to the first embodiment of the present invention.
Figure 1B:
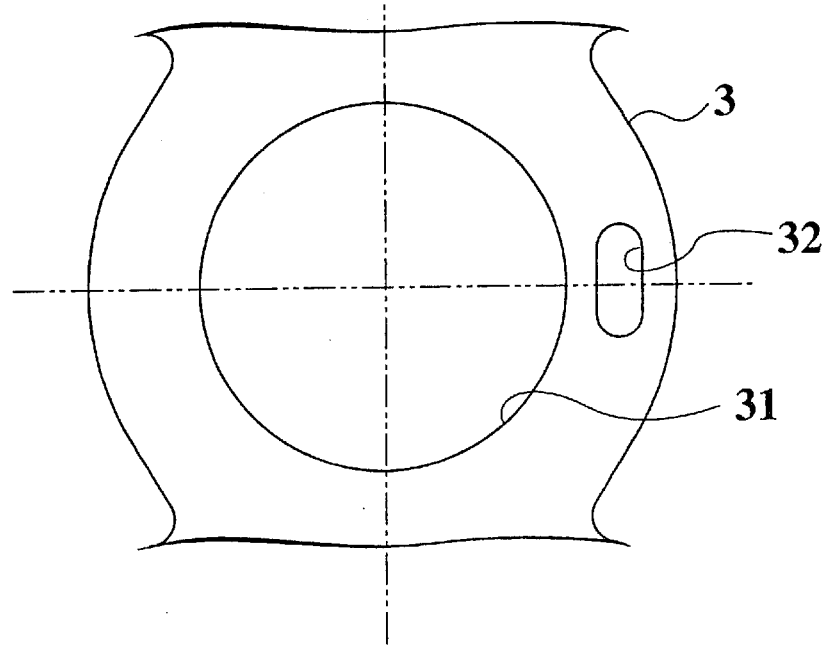
FIG. 1B is a plan view of the main part of a cylinder head gasket of the direct injection spark-ignited internal combustion engine shown in FIG. 1A.

As shown in FIG. 1A and FIG. 1B, a direct injection spark-ignited internal combustion engine E according to this embodiment of the present invention has a cylinder block 1, a cylinder head 2 opposing the cylinder block 1, a cylinder head gasket 3 that is inserted between and forms a seal between the cylinder head 1 and the cylinder block 2, a fuel injection valve 4 that injects fuel in response to an injection signal, and a fuel injection valve gasket 5 inserted between the cylinder head 1 and the fuel injection valve 4 so as to form a gas seal portion.

While the present invention does not present a restriction with regard to the cylinder block 1, in this embodiment, an open-deck type is used, in which the inner wall 11 and the outer wall 12 of the cylinder block 1 are separated. A water jacket 13 is formed between the inner wall 11 and the outer wall 12, so that cooling water circulates therein. The flow path is established so that the flow rate of this cooling water is highest at the top end of the cylinder block 1, and is reduced in speed toward the bottom of the cylinder block 1.

The cylinder head 2 has a spark plug mounting hole 23 that disposed so that it is offset to the exhaust side from the centerline 22 of the fuel combustion chamber 21, a first water jacket 24 disposed so as to surround the spark plug mounting hole 23, and a fuel injection valve mounting hole 25 disposed at the bottom (cylinder block side) of the intake port (not shown in the drawing), and the fuel injection valve 4 is mounted in the fuel injection valve mounting hole 25. Additionally, the cylinder head 2 has a second water jacket 26 that cools the body 42 of the fuel injection valve 4, and a cylinder head bottom surface 27 that is the joining surface with respect to the cylinder block 1. The centerline of the spark plug mounting hole 23 is indicated by the reference numeral 23a.

The fuel injection valve mounting hole 25 is disposed on the centerline 25a, and is formed by the circular holes 25b, 25c, 25d, and 25e, which progressively increase in diameter in four steps from the fuel combustion chamber 21 toward the outside of the cylinder head 2. These circular holes 25b through 25e are machined by cutting, and are disposed so that the fuel injection valve 4 comes as close as possible to the cylinder head bottom surface 27.

The fuel injection valve 4 has a small-diameter nozzle 41 at the tip of the large-diameter body 42 thereof, and the nozzle has a fuel injection aperture (not shown in the drawing) that is open in the direction of the fuel combustion chamber 21.

An integral flange part 43 at an intermediate position in the axial direction of the body 42 of the fuel injection valve 4 comes into direct contact with the bottom surface of the circular hole 25e of the fuel injection valve mounting hole 25 provided in the cylinder head 2, thereby acting to position the fuel injection valve 4 in the axial direction. The radial positioning of the fuel injection valve 4 is done so that there is a slight gap between the side surface of the body 42 of the fuel injection valve 4 and the side surface of the circular hole 25d.

A gap is formed in the axial direction of the centerline 25a between the bottom surface of the body 42 of the fuel injection valve 4 and the bottom surface of the circular hole 25c, and the gas seal portion is formed between the cylinder head 2 and the fuel injection valve 4 by the insertion therebetween of the fuel injection valve gasket 5.

The cylinder head gasket 3 is inserted between the top surface of the cylinder block 1 and the cylinder head bottom surface 27. The part of the cylinder head gasket 3 that corresponds to the bottom of the fuel injection valve gasket 5 is provided with a water hole 32 so that the cooling water having the fastest flow rate comes into contact with the cylinder head bottom surface 27 near the fuel injection valve gasket 5. If the centerline 22 of the fuel combustion chamber 21 is aligned top-to-bottom, this water hole 32 is opposite to the part of the fuel injection valve gasket 5 that is closest to the cylinder head bottom surface 27, so as to be substantially directly thereunder.

Additionally, because the cylinder head bottom surface 27 is also machined in the same manner as the circular hole 25c, it is possible to establish the distance between the bottom surface edge of the circular hole 25c on the cylinder head bottom surface side and the cylinder head 27 to take into consideration the machining accuracy and the required strength.

More specifically, in this embodiment of the present invention, the distance between the bottom surface end of the circular hole 25c on the cylinder head bottom surface side and the cylinder head bottom surface 27 can be made significantly smaller than 4 mm, which was the former limit imposed by machining accuracy using casting hollowing, and can be reduced to approximately 2.5 mm, even when taking into consideration tolerances.

An investigation by the inventor shows that, compared to the existing related art, from the standpoint of the achieving a prominent improvement in cooling performance of the fuel injection valve 4, it is preferable that the distance from the bottom surface end of the circular hole 25c on the cylinder head bottom surface side and the cylinder head bottom surface 27 be made 3 mm or smaller.

In this embodiment of the present invention, therefore, the fuel injection valve gasket 5 disposed on the bottom surface of the circular hole 25c is disposed in proximity to the cylinder head bottom surface 27, with which the cooling water makes contact, and the distance between the bottom surface end of the circular hole 25c on the cylinder head bottom surface side and the cylinder head bottom surface 27 is made 3 mm or smaller. However, because of the machining accuracy requirements, for example, it is preferable that this distance be made at least 2.5 mm.

The distance between the bottom surface end of the circular hole 25c on the cylinder head bottom surface side and the cylinder head bottom surface 27 can also be practically considered to be the distance between the fuel injection valve gasket 5 and the cylinder head bottom surface 27.

Figure 2:
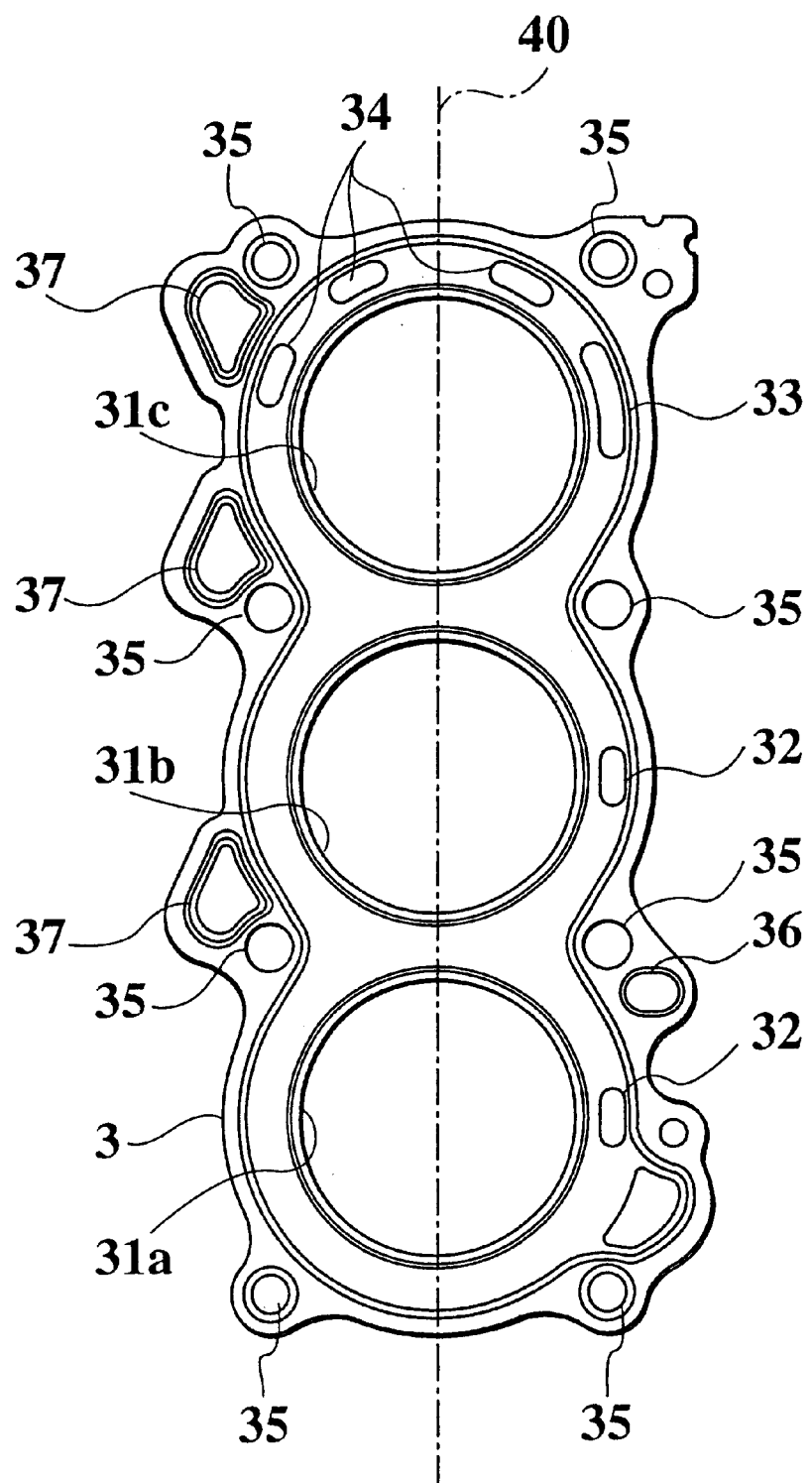
FIG. 2 is a plan view of the right bank cylinder head gasket for the case in which the direct injection spark-ignited internal combustion engine is applied to a V-6 engine in the embodiment.

FIG. 2 is a plan view that shows the overall cylinder head gasket 3 of the first embodiment, and this shows the right bank cylinder head gasket for a V6 type internal combustion engine used as the engine E according to this embodiment.

In FIG. 2, the bottom of the drawing is the front of the engine, and the top of the drawing is the rear of the engine.

In FIG. 2, the cylinder head gasket 3 has three fuel combustion chamber holes 31a, 31b, and 31c, which are arranged at an uniform spacing therebetween in the front-to-back direction along the centerline 40 parallel to the engine crankshaft, two elongated circular water holes 32 and an arc-shaped water hole 33 located on the right side of the fuel combustion chamber holes 31a, 31b, and 31c, three elongated circular water holes 34 disposed to the left and rear sides of the fuel combustion chamber 31c, bolt holes 35, an oil supply hole 36, and oil drain holes 37.

In order to achieve cooling of the fuel injection valve 4, the water holes 32 and 33 are holes that are provided so as to expose the cylinder head bottom surface 27 near the fuel injection valve gasket 5 to the water jacket 13 of the cylinder head 1.

The widths of the water holes 32 and 33 are substantially the same as the spacing between the inner wall 11 and the outer wall 12 at the top end of the cylinder block 1 as shown in FIG. 1A, and the lengths of these holes is made substantially equal to or larger than the outer diameter of the annular fuel injection valve gasket 5. The above-noted widths of the water holes 32 and 33 are the widths in a direction that is perpendicular to the centerline 40, and the lengths of the water holes 32 and 33 are the lengths in a direction that is parallel to the centerline 40.

The water holes 34 are provided so that water that has cooled the cylinder block 1 is joined with cooling water that has cooled the cylinder head 2.

The bolt holes 35 provided in the periphery of the cylinder head gasket 3 are provided for the joining of the cylinder block 1 and the cylinder head 2, the oil supply hole 36 is provided to supply oil to the cylinder head 2, and the oil drain holes 37 are provided so that oil that has lubricated the cylinder head 2 is returned to an oil pan (not shown in the drawing) via the cylinder block 1.

In this embodiment as noted above, because water holes 32 are provided in the parts of the cylinder head gasket 3 that correspond to the positions directly below the fuel injection valve gasket 5, this being the part of the fuel injection valve gasket 5 that is the closest to the bottom surface 27 of the cylinder head 2, cooling water that has the fastest flow rate in the water jacket 13 comes into contact with the cylinder head bottom surface 27 near the fuel injection valve gasket 5. Because this arrangement achieves effective cooling of the fuel injection valve 4, thereby preventing the deposits such as a carbide from developing on the nozzle, and enabling precise fuel injection.

Because the cylinder head bottom surface 27 and the circular hole 25c are formed in the same manner by machining, the distance between the bottom surface end of the circular hole 25c on the cylinder head bottom surface side and the cylinder head bottom surface 27 can be made short with good accuracy. By employing this arrangement, it is possible to bring the fuel injection valve gasket 5 disposed on the bottom surface of the circular hole 25c close to the cylinder head bottom surface 27 that is in contact with the cooling water, thereby enabling more effective radiation of heat from the fuel injection valve 4 so as to provide a further improvement in the cooling of the fuel injection valve, and enabling greater precision in the fuel injection.

Because the axial-direction length of the water holes 32, which is the length in the crankshaft direction, is made at least approximately the diameter of the fuel injection valve gasket 5, there is a further increase in the contact surface area between the cylinder head bottom surface 27 directly below the fuel injection valve 4 and the cooling water, thereby further improving the effectiveness of fuel injection valve cooling, and enabling further precision in fuel injection.

Next, a direct injection spark-ignited internal combustion engine according to the second embodiment of the present invention will be described, with reference to FIG. 3A and FIG. 3B.

Figure 3A:
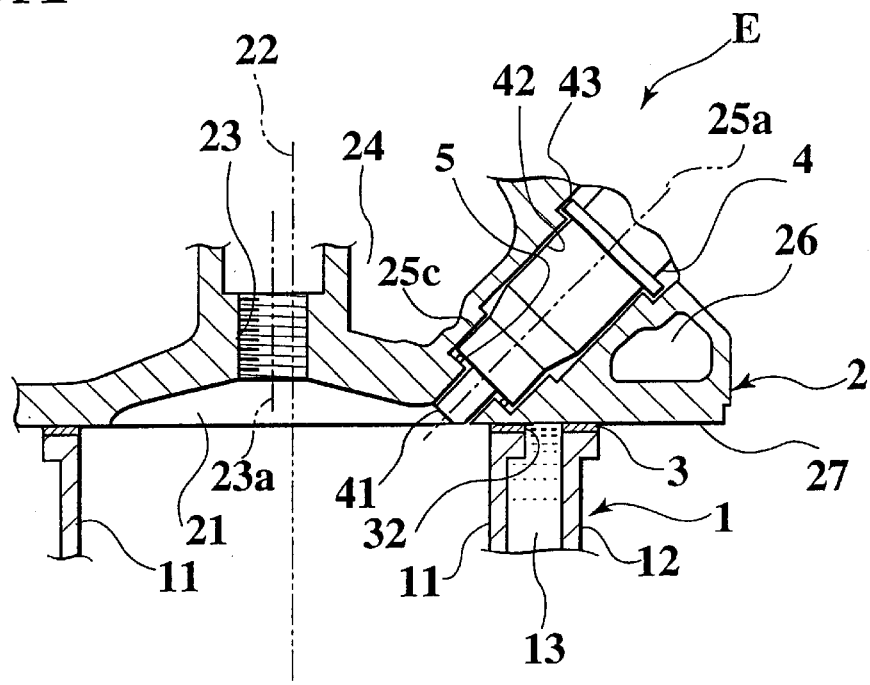
FIG. 3A is a vertical cross-section view of the main part of a direct injection spark-ignited internal combustion engine according to the second embodiment of the present invention.
Figure 3B:
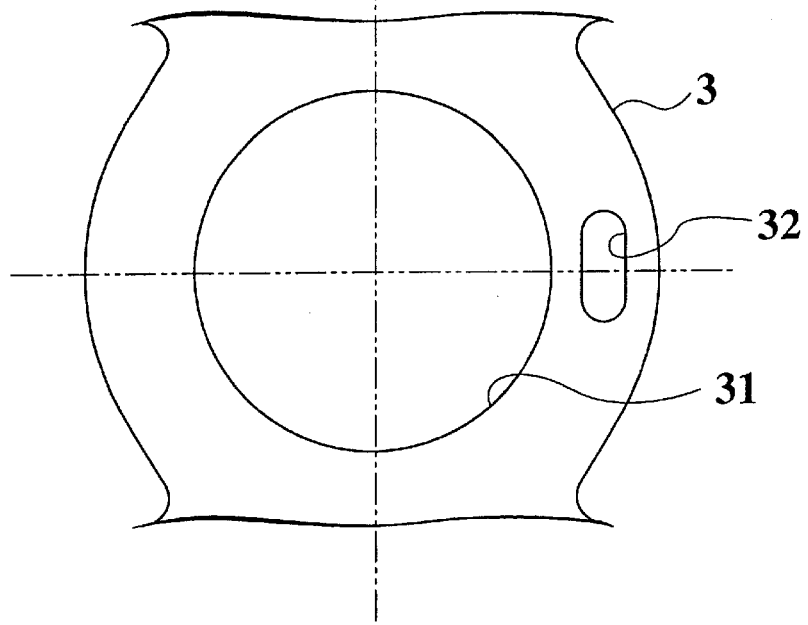
FIG. 3B is a plan view showing the cylinder head gasket of the direct injection spark-ignited internal combustion engine shown in FIG. 3A.
Figure 4:
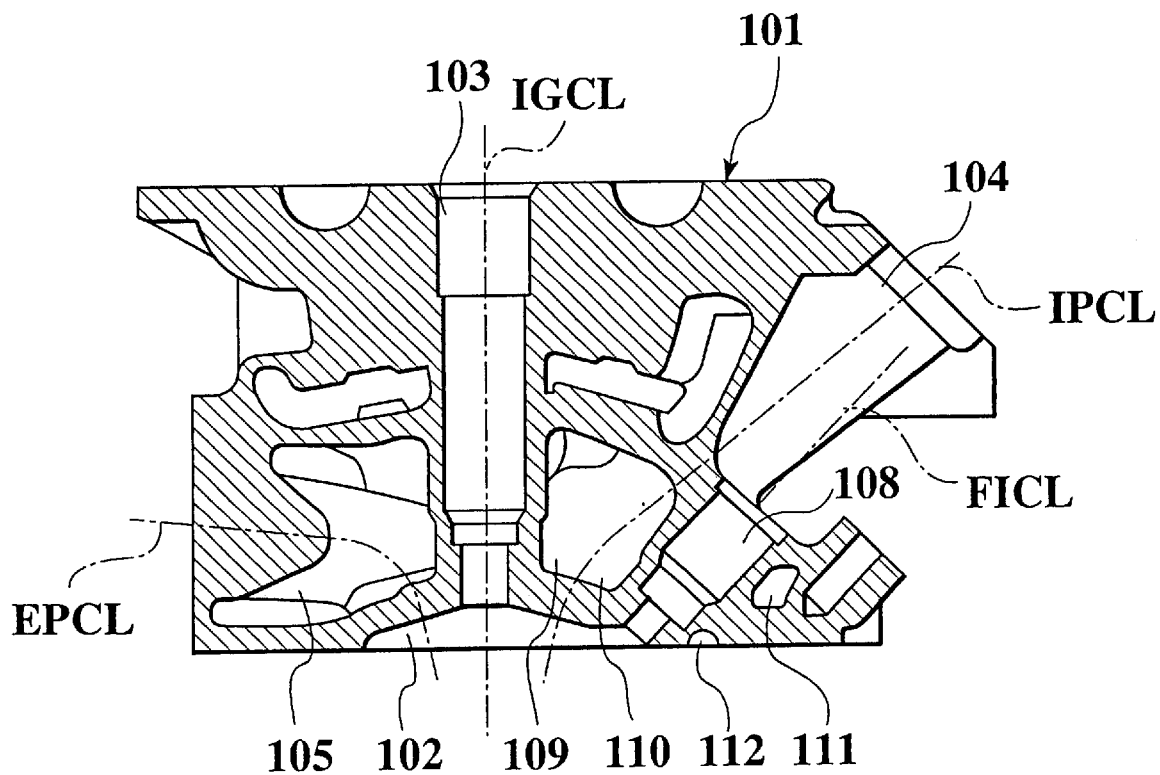
FIG. 4 is a vertical cross-section view showing the construction of a cylinder head of a direct injection spark-ignited internal combustion engine analyzed by the inventor.

The direct injection spark-ignited internal combustion engine according the second embodiment also has, as shown in FIG. 3A and FIG. 3B, a cylinder block 1, a cylinder head 2, a cylinder head gasket 3, a fuel injection valve 4, and a fuel injection valve gasket 5 that is inserted between and forms a seal between the cylinder head 2 and the fuel injection valve 4, the same as in the case of the first embodiment.

In the second embodiment, however, the water holes 32 provided in the cylinder head gasket 3 are not substantially directly below the fuel injection valve gasket 5, but are offset to the outside in the radial direction of the fuel combustion chamber 21, along the bottom surface 27 of the cylinder head 2.

In the arrangement of the second embodiment as well, because the water holes 32 are provided in the cylinder head gasket 3, cooling water having the greatest flow rate within the water jacket 13 is brought into contact with the cylinder head bottom surface 27 near the fuel injection valve gasket 5 in the same manner as in the first embodiment. In this embodiment as well, therefore, there is effective cooling of the fuel injection valve 4, thereby preventing the occurrence of the deposits such as a carbide on the nozzle, and enabling precise fuel injection.

Naturally in this embodiment as well, because the water holes cylinder head bottom surface 27 and the circular hole 25c are machined in the same manner, it is possible to make the distance between the circular hole 25c on the cylinder head bottom surface side and the cylinder head bottom surface 27 effectively smaller, and this can be reduced to approximately 2.5 mm, this being less than 3 mm, which is more than 1 mm shorter than in the past.

Additionally, in the second embodiment, even if the water holes 32 provided in the cylinder head gasket 3 are offset to the outside in the radial direction of the fuel combustion chamber 21 along the cylinder head 2 bottom surface 27, it is possible to effectively cool the fuel injection valve 4, so that even if the dimensions and shape of the fuel combustion chamber or the dimensions and shape of the fuel injection valve nozzle force the water holes 32 to be offset to the outside in the radial direction of the fuel combustion chamber 21, it is still possible to achieve effective cooling of the fuel injection valve 4, thereby enabling design with a high degree of freedom.

It will be understood that, although the above-noted embodiment was described for the case in which the positions of water holes 32 provided in the cylinder head gasket 3 are offset to the outside in the radial direction of the fuel combustion chamber 21, it is possible to achieve sufficient effect in cooling the fuel injection valve also in the case in which the water holes are offset toward the inside along the cylinder head 2 bottom surface 27.

The entire contents of a Patent Application No. TOKUGANHEI 10-361294, with a filing date of Dec. 18, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A direct injection spark-ignited internal combustion engine comprising:
   a fuel injection valve provided to a cylinder head so as to inject fuel directly into a fuel combustion chamber;
   a fuel injection valve gasket inserted between the cylinder head and the fuel injection valve, the fuel injection valve gasket being provided near a bottom surface of the cylinder head, and the bottom surface of the cylinder head having a flat portion close to the fuel injection valve gasket; and
   a water hole formed in a cylinder head gasket near the fuel injection valve gasket, wherein the water hole is entirely covered by the flat portion, and the fuel injection valve is cooled through a seal portion of the fuel injection valve gasket, by cooling water in contact with the bottom surface of the cylinder head through the water hole.

2. A direct injection spark-ignited internal combustion engine according to claim 1, wherein a length of the water hole in a crankshaft direction is no smaller than a diameter of the fuel injection valve gasket.

3. A direct injection spark-ignited internal combustion engine according to claim 1, wherein a length of the water hole in a direction perpendicular to a crankshaft direction is substantially equal to a gap between an inner wall of an upper part of a cylinder block opposed to the cylinder head and an outer wall thereof.

4. A direct injection spark-ignited internal combustion engine according to claim 1, wherein a distance between an end part of the fuel injection valve gasket on a cylinder head bottom surface side and the bottom surface of the cylinder head is no greater than substantially 3 mm.

5. A direct injection spark-ignited internal combustion engine according to claim 4, wherein the distance between the end part of the fuel injection valve gasket on the cylinder head bottom surface side and the bottom surface of the cylinder head is no less than substantially 2.5 mm.

6. A direct injection spark-ignited internal combustion engine according to claim 1, wherein the water hole is provided so as to correspond to a portion of the fuel injection valve gasket that is the closest to the bottom surface of the cylinder head.

7. A direct injection spark-ignited internal combustion engine according to claim 1, wherein the water hole is provided so as to be displaced from a position correspond to a portion of the fuel injection valve gasket that is the closest to the bottom surface of the cylinder head, along the bottom surface.

8. A direct injection spark-ignited internal combustion engine according to claim 1, wherein a valve mounting hole is formed on the cylinder head to provide the fuel injection valve therein and both of the valve mounting hole and the flat portion are formed by machining.

9. A direct injection spark-ignited internal combustion engine comprising;
- a cylinder head;
- a cylinder block;
- a gas seal portion disposed between the cylinder head and the cylinder block;
- fuel injection means, provided to the cylinder head, for injecting fuel directly into a fuel combustion chamber, and a bottom surface of the cylinder head having a flat portion close to the fuel injection means; and
- cooling means for cooling the fuel injection means, the cooling means having a water hole formed in the gas seal portion near the fuel injection means,
- wherein the water hole is entirely covered by the flat portion, and cooling water in contact with the cylinder head through the water hole acts to cool the fuel injection means.

10. A direct injection spark-ignited internal combustion engine according to claim 8, wherein a valve mounting hole is formed on the cylinder head to provide the fuel injection means therein and both of the valve mounting hole and the flat portion are formed by machining.

* * * * *